(12) United States Patent
Lee et al.

(10) Patent No.: US 11,043,709 B2
(45) Date of Patent: Jun. 22, 2021

(54) METAL-AIR BATTERY AND METHOD OF MANUFACTURING THE SAME

(71) Applicant: SAMSUNG ELECTRONICS CO., LTD., Suwon-si (KR)

(72) Inventors: Hyunpyo Lee, Seoul (KR); Hyukjae Kwon, Suwon-si (KR); Sangbok Ma, Suwon-si (KR); Heungchan Lee, Seongnam-si (KR); Dongmin Im, Seoul (KR); Wonsung Choi, Seoul (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 35 days.

(21) Appl. No.: 16/567,029

(22) Filed: Sep. 11, 2019

(65) Prior Publication Data

US 2020/0127353 A1 Apr. 23, 2020

(30) Foreign Application Priority Data

Oct. 17, 2018 (KR) .................. 10-2018-0123932

(51) Int. Cl.
*H01M 12/08* (2006.01)
*H01M 10/0562* (2010.01)
*H01M 12/02* (2006.01)

(52) U.S. Cl.
CPC ........... *H01M 12/02* (2013.01); *H01M 12/08* (2013.01); *H01M 2300/0071* (2013.01)

(58) Field of Classification Search
None
See application file for complete search history.

(56) References Cited

U.S. PATENT DOCUMENTS

| 6,210,832 | B1 | 4/2001 | Visco et al. |
| 9,356,314 | B2 | 5/2016 | Kim et al. |
| 9,666,902 | B2 | 5/2017 | Yokoyama et al. |
| 2008/0081257 | A1* | 4/2008 | Yoshida ............ H01M 10/0585 429/209 |
| 2017/0062812 | A1* | 3/2017 | Kim ..................... H01M 4/8636 |
| 2018/0230610 | A1 | 8/2018 | Laramie et al. |

FOREIGN PATENT DOCUMENTS

KR 1020160025032 A 3/2016

* cited by examiner

*Primary Examiner* — Yoshitoshi Takeuchi
(74) *Attorney, Agent, or Firm* — Cantor Colburn LLP

(57) ABSTRACT

A metal-air battery including an anode layer; a solid electrolyte layer; and a cathode layer directly contacting the solid electrolyte layer. The solid electrolyte layer and the cathode layer are a single unitary and indivisible body with no physical interlayer boundary between the solid electrolyte layer and the cathode layer. A portion of the cathode layer may be within the solid electrolyte layer. The cathode layer may protrude from the solid electrolyte layer. The method of manufacturing a metal-air battery may include forming a solid electrolyte layer on an anode layer and chemically reducing solid electrolyte in a part of the solid electrolyte layer.

25 Claims, 20 Drawing Sheets

(b)

→ HEAT TREATMENT UNDER HYDROGEN ATMOSPHERE

METAL-AIR BATTERY AND METHOD OF MANUFACTURING THE SAME

CROSS-REFERENCE TO RELATED APPLICATION

This application claims priority to and the benefit of Korean Patent Application No. 10-2018-0123932, filed on Oct. 17, 2018, in the Korean Intellectual Property Office, and all the benefits accruing therefrom under 35 U.S.C. § 119, the content of which is incorporated herein in its entirety by reference.

BACKGROUND

1. Field

The present disclosure relates to a chargeable and dischargeable secondary battery, and more particularly, to a metal-air battery and a method of manufacturing the same.

2. Description of the Related Art

A lithium-air battery, which is an example of a metal-air battery, includes lithium as an anode, a carbon material as a cathode, through which oxygen may penetrate, and an electrolyte that can transfer lithium ions. The lithium-air battery uses lithium as an anode and air as an air-electrode active material, and thus, the lithium-air battery may be used as a high capacity battery. A theoretical specific energy of a lithium-air battery is greater than 3,500 watt hours per kilogram (Wh/kg). The specific energy density of the lithium-air battery may be approximately 10 times greater than the energy density of a lithium-ion battery

SUMMARY

Provided is a metal-air battery configured to decrease an interfacial resistance between an air-electrode (cathode) and a solid electrolyte.

Provided are methods of manufacturing the metal-air battery.

Additional aspects will be set forth in part in the description which follows and, in part, will be apparent from the description, or may be learned by practice of the presented embodiments.

According to an aspect of an embodiment, a metal-air battery includes: an anode layer; a solid electrolyte layer; and a cathode layer directly contacting the solid electrolyte layer, wherein the solid electrolyte layer and the cathode layer are a single unitary and indivisible body with no physical interlayer boundary between the solid electrolyte layer and the cathode layer.

In the metal-air battery, a portion of the cathode layer may be within the solid electrolyte layer.

According to an embodiment, the cathode layer may protrude from the solid electrolyte layer.

The cathode layer may include a plurality of separated patterns.

The cathode layer may be a single layer covering an entire upper surface of the solid electrolyte layer.

The cathode layer may have a zigzag shape on the solid electrolyte layer.

The cathode layer may include a first cathode layer and a second layer that is on and surrounds the first cathode layer.

The cathode layer may have a spiral plane shape.

When the cathode layer protrudes from the solid electrolyte layer, a portion of the cathode layer may be within the solid electrolyte layer.

The plurality of separated patterns may have a periodic arrangement.

Each of the plurality of separated patterns may have a column shape or a cylindrical shape. At this point, the cylindrical shape may include a single cylindrical shape or a double cylindrical shape. In an embodiment, the cylindrical shape may include a circular cylindrical shape or a non-circular cylindrical shape.

According to an aspect of an embodiment, a method of manufacturing a metal-air battery, the method includes: forming a solid electrolyte layer on an anode layer; and changing a portion of the solid electrolyte layer into a cathode layer to manufacture the metal-air battery.

According to an embodiment, the changing of the portion of the solid electrolyte layer into the cathode layer may include defining a region of the solid electrolyte layer, and chemically reducing solid electrolyte in the defined region to change the portion of the solid electrolyte layer into the cathode layer. As an example, the chemically reducing the solid electrolyte in a portion of the solid electrolyte layer may include contacting the defined region with the reducing material layer that chemically reduces solid electrolyte in the solid electrolyte layer. As an embodiment, chemically reducing the solid electrolyte in the defined region may include heat treating the defined region under a hydrogen atmosphere.

According to an embodiment, the changing of the portion of the solid electrolyte layer into the cathode layer may include forming a protrusion in the region of the solid electrolyte layer and chemically reducing solid electrolyte in the protrusion. As an example, the chemically reducing the solid electrolyte in the protrusion may include contacting the protrusion with a reducing material layer that chemically reduces solid electrolyte in the solid electrolyte layer.

According to an embodiment, the changing of the portion of the solid electrolyte layer into the cathode layer may include chemically reducing solid electrolyte in a selected portion of an entire upper part of the solid electrolyte layer, the entire upper part including an upper surface of the solid electrolyte layer. In this process, a process of dividing the chemically reduced solid electrolyte into a plurality of separated patterns may be included. According to an embodiment, the chemically reducing the solid electrolyte in the selected portion of the entire upper part including the upper surface of the solid electrolyte layer may include contacting the entire upper surface of the solid electrolyte layer with a reducing material layer. According to an embodiment, the chemically reducing the solid electrolyte in the selected portion of the upper part including the upper surface of the solid electrolyte layer may include heat treating the solid electrolyte layer under a hydrogen atmosphere.

The dividing of the chemically reduced solid electrolyte into a plurality of separated patterns may include forming a mask on the chemically reduced solid electrolyte of the solid electrolyte layer, the mask covering regions of the chemically reduced solid electrolyte corresponding to plurality of patterns separated from each other and exposing a remaining region of the chemically reduced solid electrolyte, and etching the exposed part of the chemically reduced solid electrolyte.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
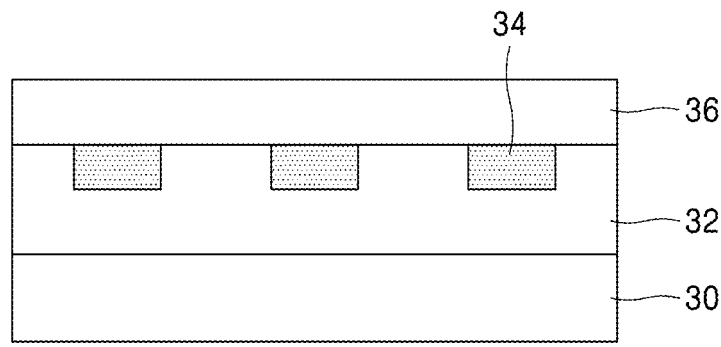
FIG. 1 is a cross-sectional view of an embodiment of a metal-air battery.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A metal-air battery, for example, a lithium-air battery uses a mixed ionic electronic conductor ("MIEC") cathode together with an inorganic based solid electrolyte, and thus, a lifetime of the battery may be increased.

However, the MIEC cathode may be an inorganic based material, and thus, crystallinity may be high and when the MIEC cathode contacts another inorganic based material, resistance may be generated or it may difficult for the MIEC cathode to contact the corresponding inorganic based material.

Accordingly, in the case of a lithium-air battery, a material layer that may transmit lithium ions may be disposed between an inorganic based solid electrolyte and the MIEC cathode. This configuration may make it difficult to manufacture an inorganic based material that may require a high temperature treatment.

In the present disclosure, various examples of metal-air batteries that do not require a bonding layer between the solid electrolyte and the MIEC cathode are described. A portion of the inorganic based solid electrolyte is chemically reduced and used as the MIEC cathode.

Metal-air batteries according to embodiments and methods of manufacturing the same will now be described with reference to the accompanying drawings. In the drawings, thicknesses of layers or regions may be exaggerated for clarity of the specification.

FIG. 1 is a cross-sectional view of a metal-air battery according to an embodiment.

As depicted in FIG. 1, the metal-air battery according to an embodiment includes an anode layer 30, a solid electrolyte layer 32, and a plurality of cathode layers 34. The anode layer 30 may be a metal layer. The anode layer 30 may include a lithium layer. As an example, the entire anode layer 30 may be a lithium layer. The cathode layers 34 are regions that contact air, and thus, may be referred to as an air-electrode. The solid electrolyte layer 32 is arranged between the anode layer 30 and the cathode layers 34. Metal ions (for example, lithium ions) are generated at the anode layer 30 when the metal-air battery is discharged, and the metal ions arrive at the cathode layers 34 through the solid electrolyte layer 32. Due to the presence of the solid electrolyte layer 32, a direct contact between the anode layer 30 and the cathode layers 34 is prevented. The solid electrolyte layer 32 may include, for example, a lithium-lanthanum-titanium oxide ("LLTO") layer. The LLTO layer may be, as an example, a $Li_{0.33}La_{0.57}TiO_3$ layer. The plurality of cathode layers 34 are separated from each other. For convenience, in FIG. 1, only three cathode layers 34 are depicted. The number of the cathode layers 34 is not limited to three. The number of the cathode layers 34 may be greater than three or less than three. In terms of role and chemical composition, the cathode layers 34 may be distinguished from the solid electrolyte layer 32. However, there is no physical boundary between the cathode layers 34 and the solid electrolyte layer 32. In other words, a physical boundary of an interlayer, for example, a boundary of a material layer that is present between the anode layer 30 and the solid electrolyte layer 32, is not present between the cathode layers 34 and the solid electrolyte layer 32. In this way, the plurality of cathode layers 34 and the solid electrolyte layer 32 are a continuous single body, e.g., a single unitary and indivisible body, without a physical boundary because the plurality of cathode layers 34 are resultant products formed by chemically reducing solid electrolyte in parts of the solid electrolyte layer 32. The plurality of cathode layers 34 are MIEC layers, and has a conductivity greater than the conductivity of the solid electrolyte layer 32 with respect to electrons and ions. The plurality of cathode layers 34 are material layers and are continuous with the solid electrolyte layer 32. Since there is no physical layer boundary between the plurality of cathode layers 34 and the solid electrolyte layer 32, the problem caused by high contact resistance or interfacial resistance between a cathode layer and a solid electrolyte layer may be solved. Also, when a physical layer interface is present between a cathode and a solid electrolyte layer, an additional bonding layer for decreasing an interfacial resistance may be present. However, in the metal-air battery depicted in FIG. 1, the bonding layer may not be present, and thus, the configuration of the battery may be simplified. The characteristics of the plurality of cathode layers 34 may be also applied to cathode layers of metal-air batteries described below. The plurality of cathode layers 34 are distributed in a buried type in, e.g., disposed within, the solid electrolyte layer 32. In detail, only parts (for example, upper surfaces) of the plurality of cathode layers 34 are exposed, and remaining parts are surrounded by the solid electrolyte layer 32 and are covered by the solid electrolyte layer 32. Accordingly, only the exposed parts of the plurality of cathode layers 34 may directly contact air. In the case of FIG. 1, from the point that the cathode layers 34 are a single body, e.g., a single unitary and indivisible body, with the solid electrolyte layer 32, the plurality of cathode layers 34 may be referred to as "cathode regions" in the solid electrolyte layer 32.

A gas diffusion layer ("GDL") 36 may be arranged on the solid electrolyte layer 32. The GDL 36 diffuses air to the cathode layers 34. The GDL 36 may be a layer including carbon, as an example, a graphene layer. The GDL 36 may contact the plurality of cathode layers 34 and the solid electrolyte layer 32.

Figure 2:
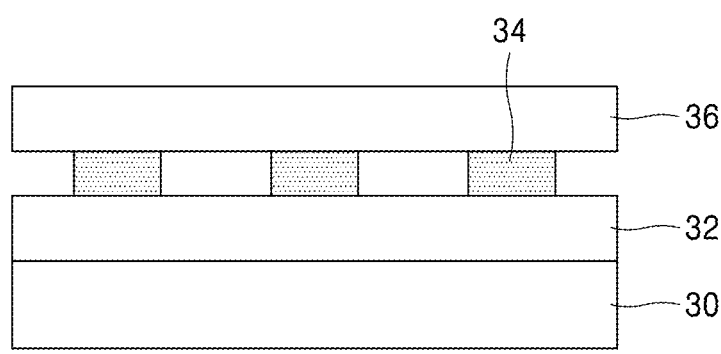
FIG. 2 is a cross-sectional view of an embodiment of a metal-air battery.

FIG. 2 is a cross-sectional view of a metal-air battery according to an embodiment. In FIG. 2, reference numerals identical to the reference numerals described with reference to FIG. 1 indicate elements identical elements described with reference to FIG. 1, and thus, the descriptions thereof will be omitted. This is the same in the metal-air batteries described below.

Referring to FIG. 2, the GDL 36 is arranged on the solid electrolyte layer 32. The solid electrolyte layer 32 and the GDL 36 are separated from each other. The plurality of cathode layers 34 are present between the separated solid electrolyte layer 32 and the GDL 36. The plurality of cathode layers 34, as described above, are formed by chemically reducing solid electrolyte in parts of the solid electrolyte layer 32, and have a shape protruding from the solid electrolyte layer 32 towards the GDL 36. The plurality of cathode layers 34 have the same thickness each other. The thickness of the plurality of cathode layers 34 may be equal to a gap between the solid electrolyte layer 32 and the GDL 36. The GDL 36 directly contacts upper surfaces of the cathode layers 34. In FIG. 2, the cathode layers 34 may contact air through upper surfaces and side surfaces.

Figure 3:
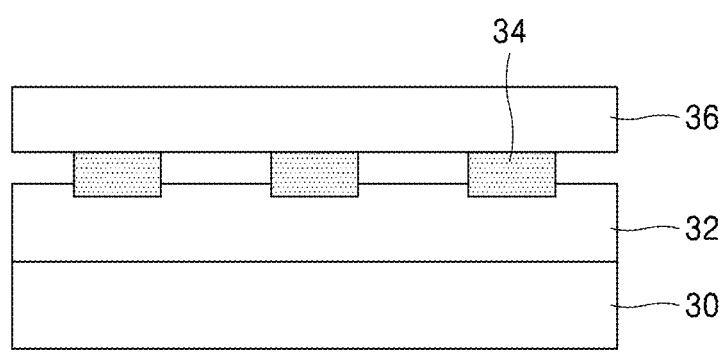
FIG. 3 is a cross-sectional view of an embodiment of a metal-air battery.

FIG. 3 is a cross-sectional view of a metal-air battery according to an embodiment.

Referring to FIG. 3, the GDL 36 is arranged on the solid electrolyte layer 32. The solid electrolyte layer 32 and the GDL 36 are separated from each other. The plurality of cathode layers 34 are present between the solid electrolyte layer 32 and the GDL 36. The GDL 36 contacts upper surfaces of the cathode layers 34. The GDL 36 covers an entire upper surface of the cathode layers 34. The plurality of cathode layers 34 have a shape protruding from the solid electrolyte layer 32. A lower part of one or more of the plurality of cathode layers 34 can have a shape buried in, e.g., within, the solid electrolyte layer 32. That is, an upper part of one or more of the cathode layers 34 can protrude from the solid electrolyte layer 32, and the remaining part, e.g., the lower part, of the one or more cathode layers 34 can be buried in, e.g., within, the solid electrolyte layer 32. In the case of FIG. 3, the cathode layers 34 may contact air through side surfaces of the cathode layers 34, upper surfaces of the cathode layers 34, or a combination thereof.

Figure 4:
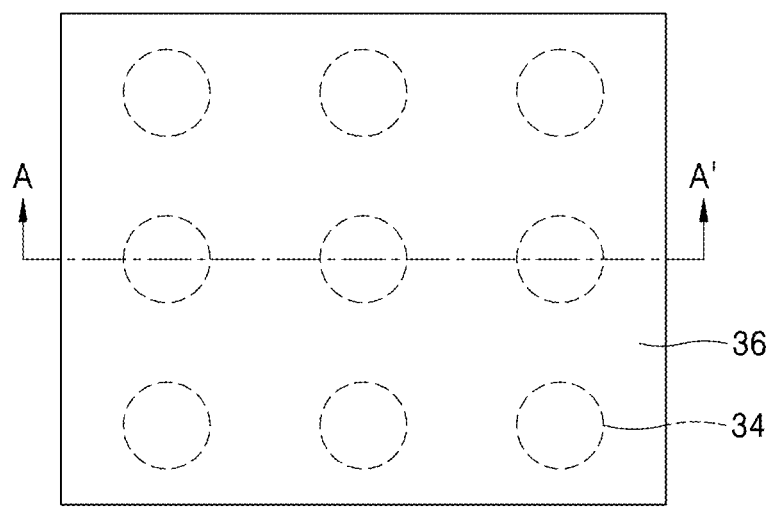
FIG. 4 is a plan view of the metal-air battery depicted in FIGS. 1 through 3.

FIG. 4 is a plan view of the metal-air battery depicted in FIGS. 1 through 3. FIGS. 1 through 3 may correspond to the cross-section cut FIG. 4 in an A-A' direction.

Referring to FIG. 4, the plurality of cathode layers 34 form a lattice shape arrangement below the GDL 36. Nine cathode layers 34 are distributed, e.g., disposed, below the GDL 36. However, the number of the cathode layers 34 may be more than nine or less than nine. In FIG. 4, a plan view of the cathode layers 34 is a circular shape, but the shape of the cathode layers 34 is not limited to the circular shape and, as described below, may be an arbitrary shape besides the circular shape. Also, the arrangement of the plurality of cathode layers 34 may be a non-lattice shape.

Referring to FIGS. 1 through 3 and FIG. 4 together, each of the cathode layers 34 has a column shape. Although each of the cathode layers 34 is depicted as a circular column as a column shape, as described below, each of the cathode layers 34 may be a non-circular column or a cylindrical shape.

Figure 5:
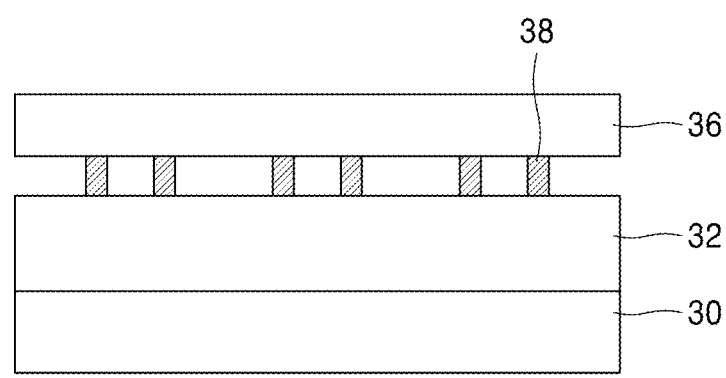
FIG. 5 is a cross-sectional view of an embodiment of a metal-air battery.

FIG. 5 is a cross-sectional view of a metal-air battery according to an embodiment.

Referring to FIG. 5, a plurality of cathode layers 38 are arranged between the solid electrolyte layer 32 and the GDL 36. The plurality of cathode layers 38 have a shape protruding from the solid electrolyte layer 32. Each of the plurality of cathode layers 38 has a cylindrical structure. The GDL 36 covers the plurality of cathode layers 38 and contacts an upper surface of each of the plurality of cathode layers 38.

Figure 6:
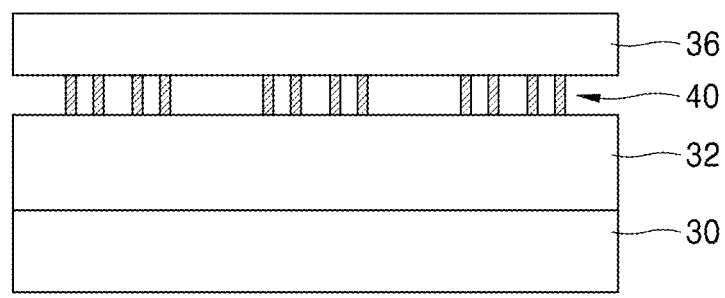
FIG. 6 is a cross-sectional view of an embodiment of a metal-air battery.

FIG. 6 is a cross-sectional view of a metal-air battery according to an embodiment.

Referring to FIG. 6, a plurality of cathode layers 40 are arranged between the solid electrolyte layer 32 and the GDL 36. The plurality of cathode layers 40 have a shape protruding from the solid electrolyte layer 32. Each of the plurality of cathode layers 40 has a double cylindrical structure. The GDL 36 covers the plurality of cathode layers 40 and contact an upper surface of each of the plurality of cathode layers 40.

Figure 7:
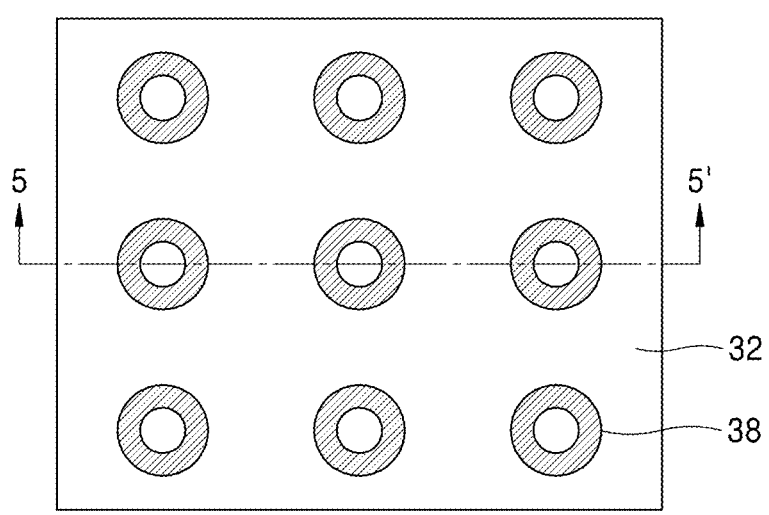
FIG. 7 is a plan view of the metal-air battery depicted in FIG. 5.

FIG. 7 is a plan view of the metal-air battery depicted in FIG. 5. For convenience, the GDL 36 is omitted. FIG. 5 shows a cross-section cut in a 5-5' direction of the metal-air battery of FIG. 7.

Referring to FIG. 7, nine cathode layers 38 are arranged on the solid electrolyte layer 32. The number of the cathode layers 38 is not limited to nine, and may be more or less than nine. The cathode layers 38 are arranged in a lattice shape, but in an embodiment, the arrangement may be changed. A plan view of the cathode layers 38 is a circular shape, but is not limited to the circular shape. Referring to FIGS. 5 and 7 together, each of the cathode layers 38 has a cylindrical structure. That is, each of the plurality of cathode layers 38 may has a cylindrical structure protruding from the solid electrolyte layer 32.

Figure 8:
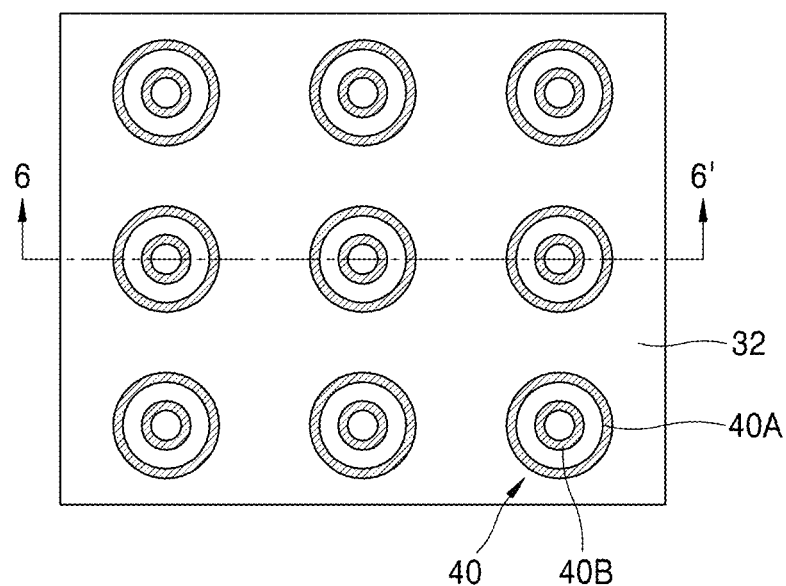
FIG. 8 is a plan view of the metal-air battery depicted in FIG. 6.

FIG. 8 is a plan view of the metal-air battery depicted in FIG. 6. For convenience, the GDL 36 is not depicted. FIG. 6 shows a cross-section cut in a 6-6' direction of the metal-air battery of FIG. 8.

Referring to FIG. 8, nine cathode layers 40 are arranged in a lattice shape on the solid electrolyte layer 32. The number of the cathode layers 40 is not limited to nine. A plan view of the cathode layers 40 is a double circular shape. Referring to FIGS. 6 and 8 together, each of the cathode layers 40 has a double cylindrical structure protruding from the solid electrolyte layer 32. That is, each of the cathode layers 40 includes a first cylindrical protrusion 40A and a second cylindrical protrusion 40B located an inner side of the first cylindrical protrusion 40A. The first and second cylindrical protrusions 40A and 40B are separated from each other. In FIG. 8, a plan view of the cathode layers 40 is a circular shape, but may be a non-circular shape, for example, a rectangular shape.

Figure 9:
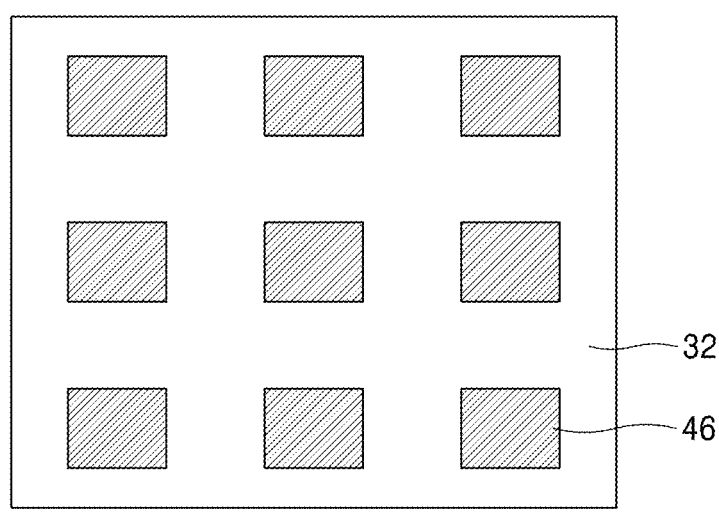
FIGS. 9, 10, 11, 12A, and 12B are plan views of an embodiment of a metal-air battery.

FIG. 9 is a plan view of the metal-air battery according to an embodiment. For convenience, the GDL 36 is not depicted.

Referring to FIG. 9, a plurality of cathode layers 46 are distributed, e.g., disposed, on the solid electrolyte layer 32. As the plurality of cathode layers 46, nine cathode layers 46 are arranged in a lattice shape, but the number of the cathode layers is not limited to nine and also, the arrangement shape is not limited to the lattice shape.

The plurality of cathode layers 46 are separated from each other, and each of the cathode layers 46 has a quadrangle, for example, a square, but may have a different shape. When a cross-section of each of the cathode layers 46 is considered, each of the cathode layers 46 may have a quadrangle column.

Figure 10:
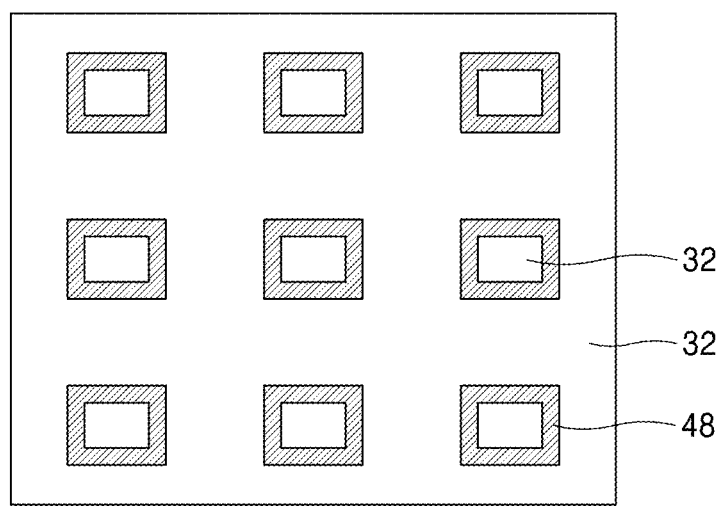

FIG. 10 is a plan view of the metal-air battery according to an embodiment. For convenience, the GDL 36 is not depicted.

Referring to FIG. 10, a plurality of cathode layers 48 are on the solid electrolyte layer 32. The number of the cathode layers 48 is nine, but is not limited to nine. The plurality of cathode layers 48 are arranged in a lattice shape, but the shape is not limited thereto. A plan view of each of the plurality of cathode layers 48 has a hollow quadrangle structure. That is, when a cross-section of each of the cathode layers 48 is considered, each of the cathode layers 48 has a quadrangle cylindrical shape. That is, each of the cathode layers 48 may have a structure in a quadrangle cylindrical shape protruding from the solid electrolyte layer 32.

Figure 11:
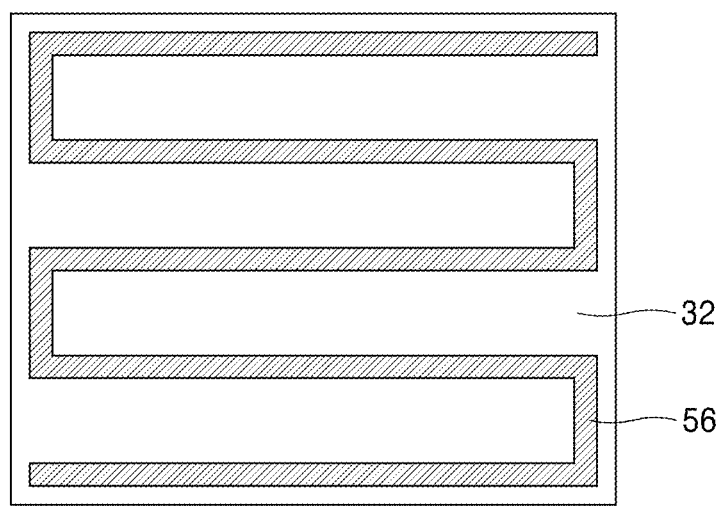

FIG. 11 is a plan view of the metal-air battery according to an embodiment.

Referring to FIG. 11, a cathode layer 56 is on the solid electrolyte layer 32. The cathode layer 56 may have a non-lattice shape. In a plan view, the cathode layer 56 may have a zigzag shape.

Figure 12A:
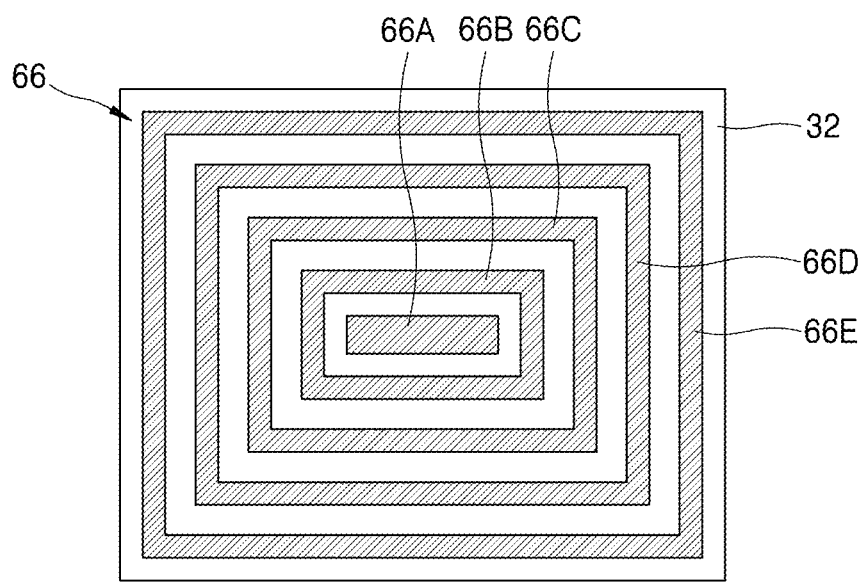
Figure 12B:
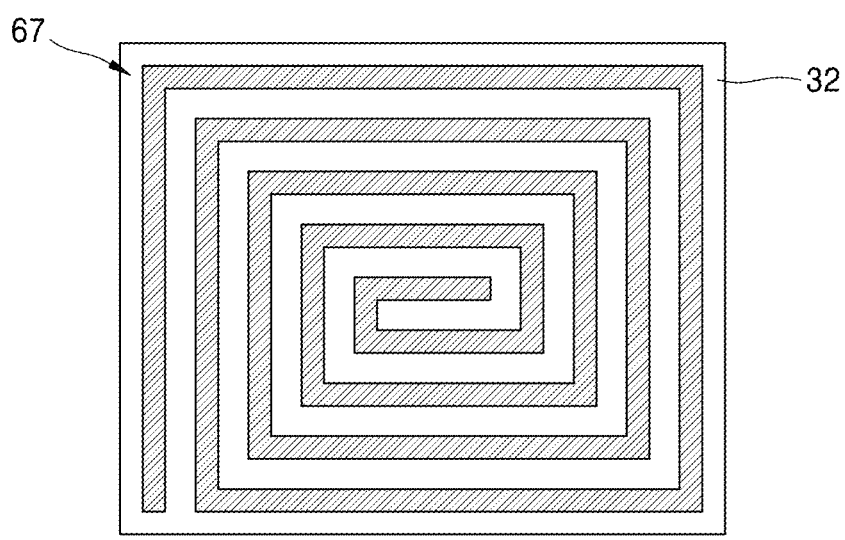

FIGS. 12A and 12B are plan views of a metal-air battery according to an embodiment.

Referring to FIG. 12A, a cathode layer 66 is on the solid electrolyte layer 32. On a plan view of the cathode layer 66, the cathode layer 66 includes a plurality of cathode layers 66A through 66E that are separated from each other. That is, the cathode layer 66 may include a first cathode layer 66A located in the center.

The first cathode layer 66A may have a quadrangle. However, the shape of the first cathode layer 66A is not limited thereto, that is, may be a circular shape, or a polygonal shape other than the quadrangle. Second through N$^{th}$ cathode layers (N>2) that sequentially surround the first cathode layer 66A may further be provided around the first cathode layer 66A. As an example, the first cathode layer 66A is completely surrounded by the second cathode layer 66B. The first cathode layer 66A and the second cathode layer 66B are separated from each other. The second cathode layer 66B may have an appearance similar to that of the first cathode layer 66A. The second cathode layer 66B may be a quadrangle belt. The second cathode layer 66B is completely surrounded by the third cathode layer 66C. The second and third cathode layers 66B and 66C are separated from each other. The third cathode layer 66C has a shape similar to that of the second cathode layer 66B. The third cathode layer 66C may be a quadrangle belt. The third cathode layer 66C is completely surrounded by the fourth cathode layer 66D. The third and fourth cathode layers 66C and 66D are separated from each other. The fourth cathode layer 66D has a shape similar to that of the third cathode layer 66C. The fourth cathode layer 66D may be a quadrangle belt. The fourth cathode layer 66D is completely surrounded by the fifth cathode layer 66E. The fourth and fifth cathode layers 66D and 66E are separated from each other. The fifth cathode layer 66E may be a quadrangle belt. Like this, a plurality of quadrangle belts may be present around the first cathode layer 66A. In FIG. 12A, for convenience of explanation, four quadrangle belts 66B through 66E that are separated from each other are depicted around the first cathode layer 66A, but the number of quadrangle belts may be more or less than four. Also, it is depicted that the second through fifth belts 66B through 66E have the same thickness, but may have different thicknesses. For example, the thickness of the second through fifth belts 66B through 66E may be increased or decreased in a direction away from the first cathode layer 66A.

FIG. 12B shows a case in which a spiral cathode layer 67 is formed on the solid electrolyte layer 32.

Figure 13:
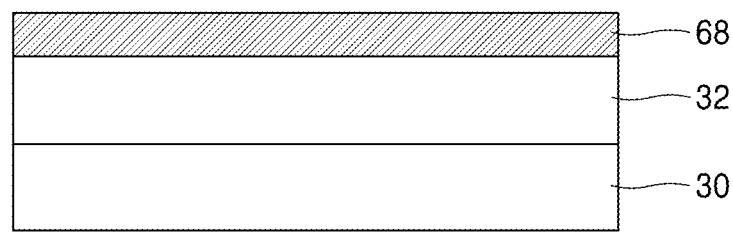
FIG. 13 is a cross-sectional view of an embodiment of a metal-air battery.

Next, as depicted in FIG. 13, in a metal-air battery according to an embodiment, an entire upper surface of the solid electrolyte layer 32 may be completely covered by a cathode layer 68. FIG. 13 shows a result after solid electrolyte in a selected portion of the entire upper part of the solid electrolyte layer 32 is chemically reduced. Before the reduction, the cathode layer 68 was the upper part of the solid electrolyte 32.

Next, methods of manufacturing metal-air batteries according to various embodiments will be described. In the descriptions of the manufacturing methods, the description of forming a GDL that may be optionally formed will be omitted.

FIGS. 14A, 14B, 15A, 15B, 16, 17A, and 17B are cross-sectional views of a method of manufacturing (hereinafter, a first manufacturing method) a metal-air battery according to an embodiment.

Figure 14A:
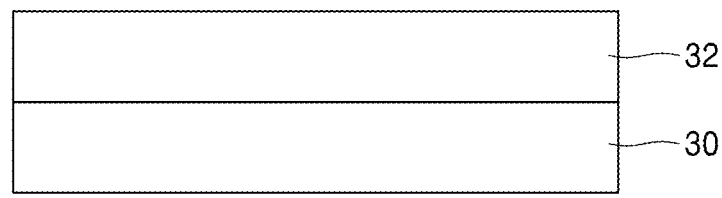
FIGS. 14A, 14B, 15A, 15B, 16, 17A, and 17B are cross-sectional views of an embodiment of a method of manufacturing a metal-air battery.
Figure 14B:
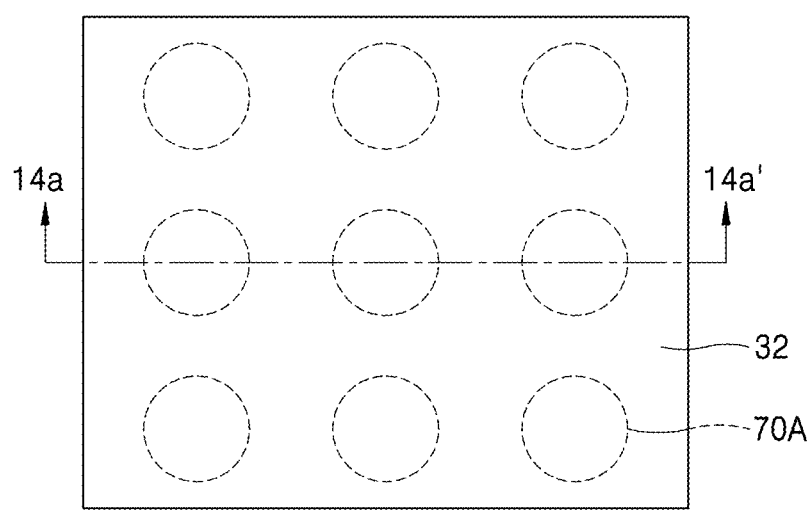
Figure 15A:
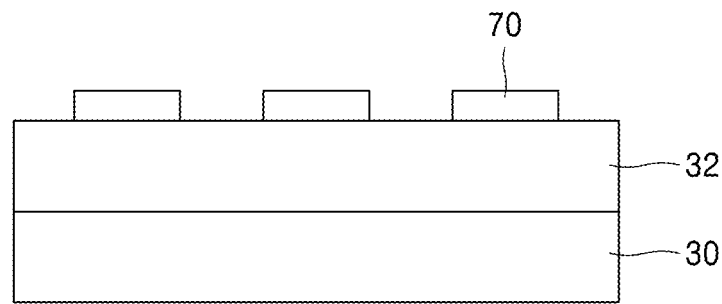
Figure 15B:
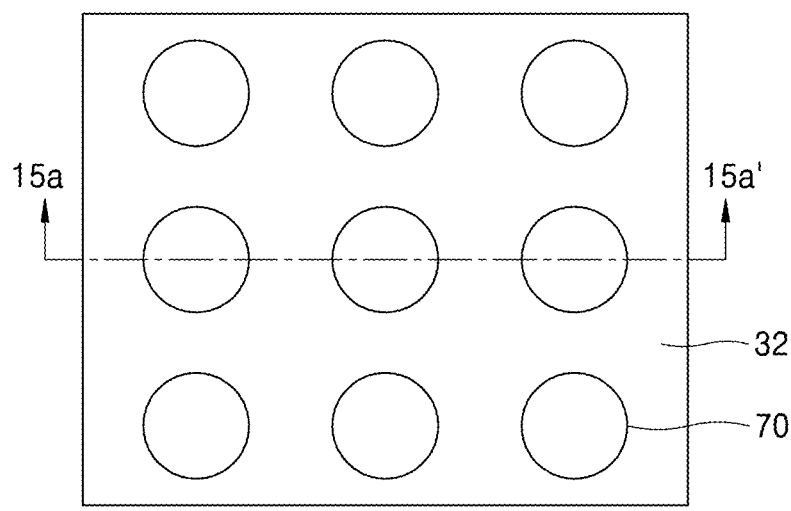
Figure 17A:
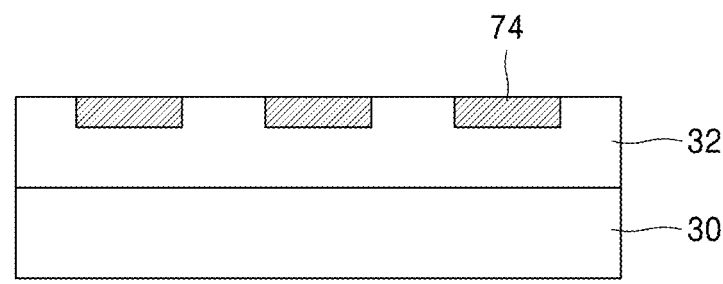
Figure 17B:
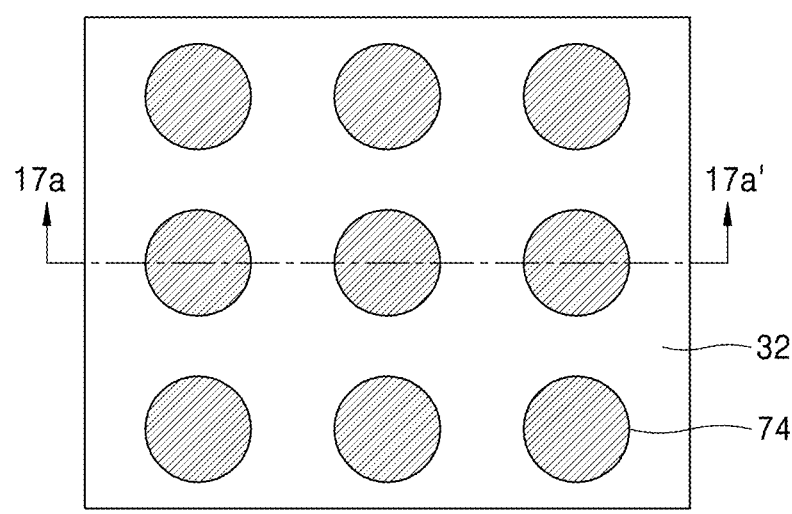

FIGS. 14A, 15A, and 17A are cross-sectional views, and FIGS. 14B, 15B, and 17B are plan views. FIGS. 14A, 15A, and 17A are cross-sectional views of FIGS. 14B, 15B, and 17B taken in a given direction.

As depicted in FIG. 14A, in the first manufacturing method, the solid electrolyte layer 32 is formed on the anode layer 30. As depicted in FIG. 14B, a plurality of regions 70A are set in the solid electrolyte layer 32. The plurality of regions 70A are separated from each other. The plurality of regions 70A are regions to be converted to cathode layers. The plurality of regions 70A may be arranged as the same type as the arrangement of the cathode layers 34 of FIG. 4.

In the drawing, the number of the plurality of regions 70A is nine, but is not limited thereto, and may be more or less than nine. FIG. 14A shows a cross-sectional view taken in a direction of 14a-14a' of FIG. 14B.

Next, as depicted in FIGS. 15A and 15B, reducing material layers 70 respectively are temporarily attached onto the plurality of regions 70A. The reducing material layers 70 are material layers that chemically reduce a material that contacts the reducing material layers 70. The reducing material layers 70 respectively cover an entire upper surface of each of the plurality of regions 70A. The reducing material layers 70 directly contact the plurality of regions 70A. The reducing material layers 70 may be, for example, lithium layers. Other material layers besides the lithium layers may be used as the reducing material layers 70 according to the kind of the solid electrolyte layer 32. FIG. 15A shows a cross-section cut in a direction 15a-15a' of FIG. 15B.

Figure 16:
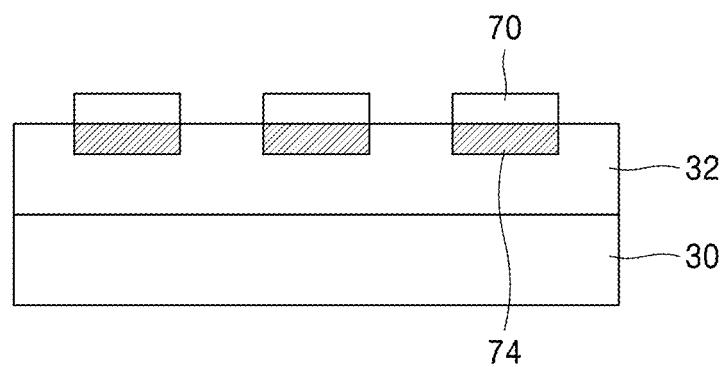

When the reducing material layers 70 are attached onto the plurality of regions 70A, as depicted in FIG. 16, a reducing reaction may occur in regions where the solid electrolyte layer 32 contacts the reducing material layers 70. The reducing reaction may occur while the reducing material layers 70 are attached to the solid electrolyte layer 32. Accordingly, reduction layers 74 are generated in regions of the solid electrolyte layer 32 below the reducing material layers 70, that is, in the plurality of regions 70A. The reduction layers 74 may expand into the solid electrolyte layer 32 below the reducing material layers 70. The expansion of the reducing material layers 70 may stop by removing the reducing material layers 70. Accordingly, a thickness of the reduction layers 74 may be controlled by controlling a contact time between the reducing material layers 70 and the solid electrolyte layer 32. When the thickness of the reduction layers 74 reaches to a desired or set thickness, the reducing material layers 70 are removed. FIGS. 17A and 17B show a resultant product when the reducing material layers 70 are removed. FIG. 17A shows a cross-section cut in a 17a-17a' direction of FIG. 17B. Referring to FIGS. 17A and 17B, a plurality of reduction layers 74 are in the solid electrolyte layer 32 and separated from each other. The plurality of reduction layers 74 form a lattice type arrangement. Since the plurality of reduction layers 74 are formed by chemically reducing solid electrolyte in in some parts of the solid electrolyte layer 32, the plurality of reduction layers 74 may have a large electron and ion conductivity greater than those of the solid electrolyte layer 32. The plurality of reduction layers 74 are used as the cathode layers 34 of FIG. 1.

FIGS. 18A, 18B, 19, 20, and 21 are cross-sectional views of a method of manufacturing (hereinafter, a second manufacturing method) a metal-air battery according to an embodiment.

Figure 18A:
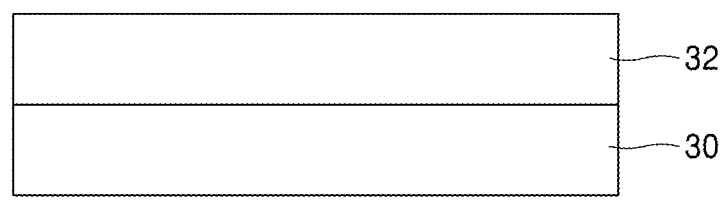
FIGS. 18A, 18B, 19, 20, and 21 are cross-sectional views of an embodiment of a method of manufacturing a metal-air battery.
Figure 18B:
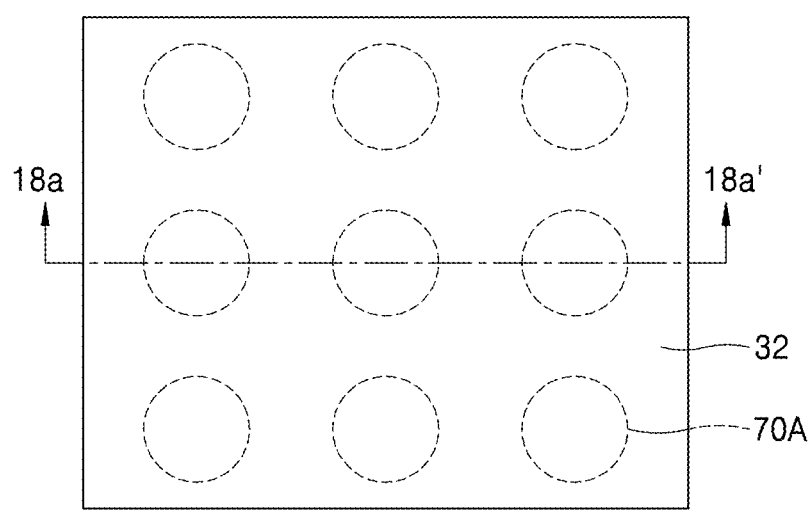

FIG. 18A is cross-sectional views and FIG. 18B is a plan view. FIG. 18A is a cross-sectional view taken in a direction of 18a-18a' of FIG. 18B.

As depicted in FIG. 18A, in the second manufacturing method, the solid electrolyte layer 32 is formed on the anode layer 30. The anode layer 30 may be formed on a base substrate. A plurality of regions 70A separated from each other are set in the solid electrolyte layer 32. The reason to set and arrangement type of the plurality of regions 70A are the same as the description made with reference to FIGS. 14A and 14B.

Figure 19:
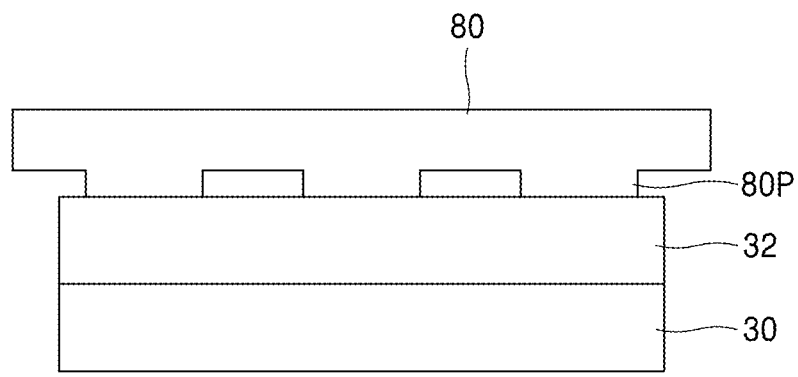
Figure 20:
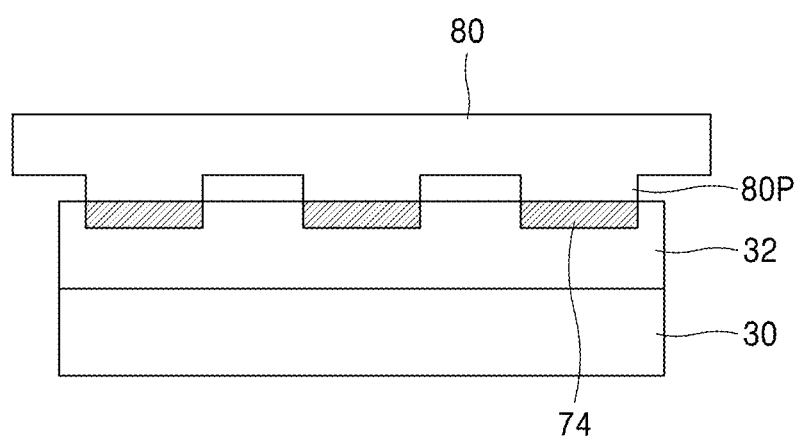
Figure 21:
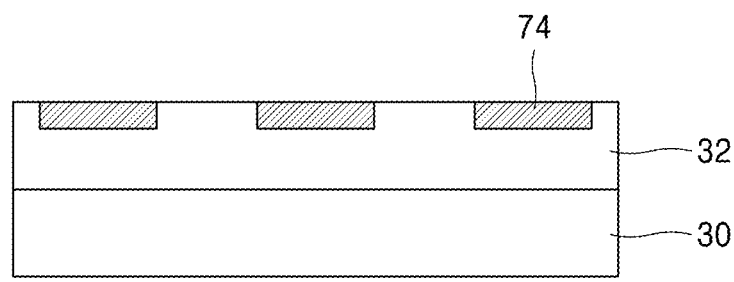

Next, as depicted in FIG. 19, a reducing material layer stamp 80 is attached onto the solid electrolyte layer 32. The reducing material layer stamp 80 includes a plurality of protrusions 80P in a direction towards the solid electrolyte layer 32. The number and the arrangement type of the protrusions 80P may be equal to the number and arrangement type of the plurality of regions 70A set in the solid electrolyte layer 32. Accordingly, the plurality of protrusions 80P of the reducing material layer stamp 80 and the plurality of regions 70A of the solid electrolyte layer 32 may contact one to one. When the protrusions 80P of the reducing material layer stamp 80 are attached to the solid electrolyte layer 32, a reducing reaction occurs in the regions of the solid electrolyte layer 32 where contacts the protrusions 80P. The reducing reaction may be continued while the protrusions 80P contact the solid electrolyte layer 32. As depicted in FIG. 20, as a result of the reducing reaction of the protrusions 80P, the reduction layers 74 are generated in the region where the protrusions 80P of the reducing material layer stamp 80 contact the solid electrolyte layer 32. While the reducing reaction is continued, the reduction layers 74 may extend into the solid electrolyte layer 32 below the protrusions 80P. The thickness of the reduction layers 74 may be controlled by controlling the contact time between the protrusions 80P and the solid electrolyte layer 32. When the thickness of the reduction layers 74 reaches to a desired value or a set value, the reducing material layer stamp 80 is separated from the solid electrolyte layer 32. In this way, as depicted in FIG. 21, a plurality of reduction layers 74 separated from each other are formed in the solid electrolyte layer 32. The reduction layers 74 are used as cathode layers. The reduction layers 74 of FIGS. 17 and 21 are formed as a result of chemically reducing solid electrolyte in some parts of the solid electrolyte layer 32, and thus, there is no physical boundary between the reduction layers 74 and the solid electrolyte layer 32, for example, an interlayer boundary between material layers. Accordingly, a contact resistance or an interfacial resistance between the solid electrolyte layer 32 and the reduction layers 74 may be decreased.

Figure 22A:
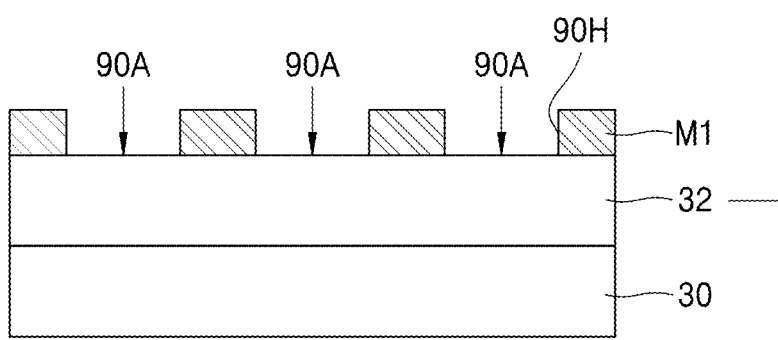
FIGS. 22A, 22B, 23A, 23B, 24A, and 24B are cross-sectional views of an embodiment of a method of manufacturing a metal-air battery.
Figure 22B:
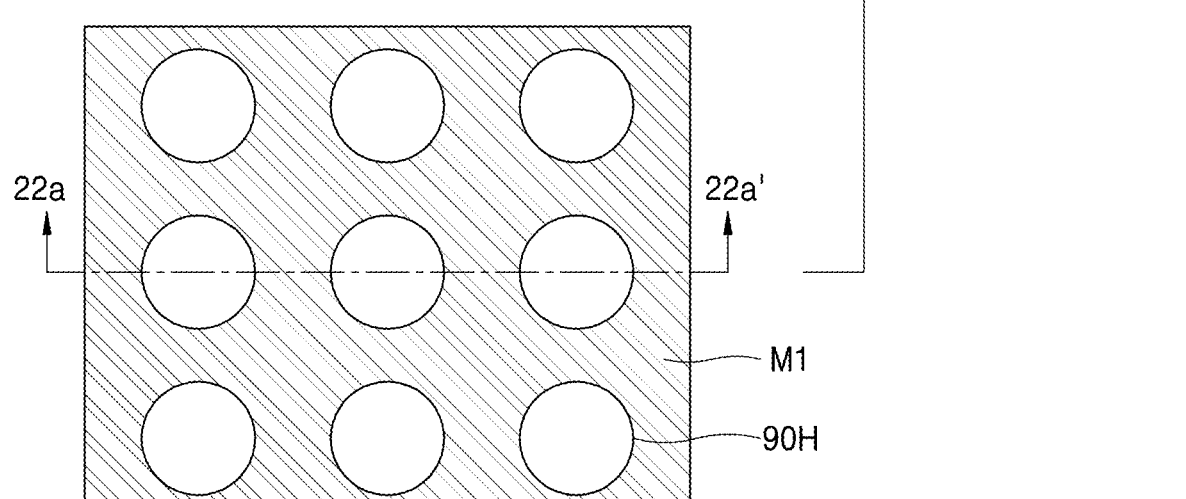
Figure 23A:
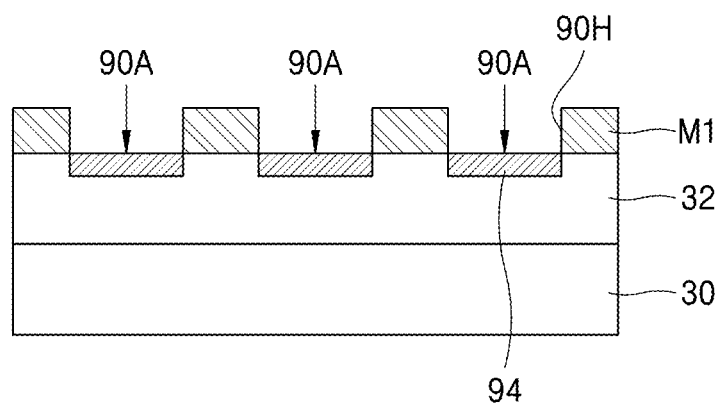
Figure 23B:
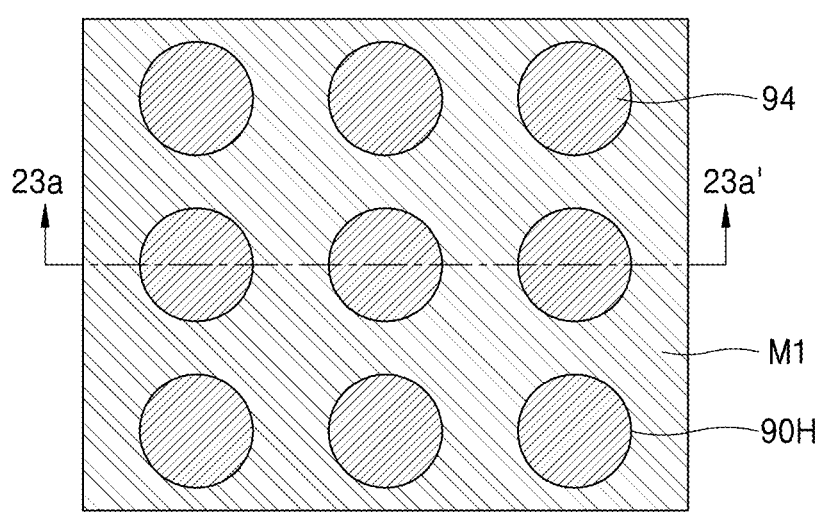
Figure 24A:
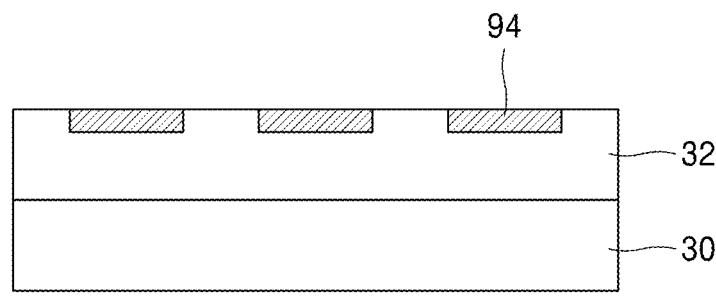
Figure 24B:
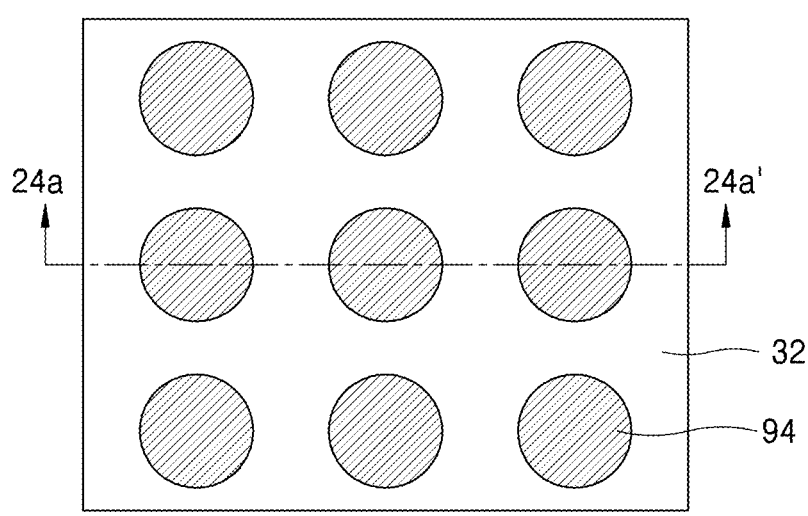

FIGS. 22A, 22B, 23A, 23B, 24A, and 24B are cross-sectional views of a method of manufacturing (hereinafter, a third manufacturing method) a metal-air battery according to an embodiment. FIGS. 22A, 23A, and 24A, are cross-sectional views and FIGS. 22B, 23B, and 24B are plan views. FIGS. 22A, 23A, and 24A are cross-sectional views of FIGS. 14B, 15B, and 17B cut in a given direction.

FIG. 22A shows a cross-sectional view taken in a direction of 22a-22a' of FIG. 22B.

As depicted in FIGS. 22A and 22B, in the third manufacturing method, the solid electrolyte layer 32 is formed on the anode layer 30. The anode layer 30 may be formed on a base substrate. A mask M1 that exposes some regions of the solid electrolyte layer 32 is formed on the solid electrolyte layer 32. In the mask M1, a plurality of holes 90H that expose the some regions of the solid electrolyte layer 32 are formed. The plurality of holes 90H are separated from each other and form a lattice type arrangement. Accordingly, regions 90A of the solid electrolyte layer 32 exposed through the holes 90H of the mask M1 may have the same arrangement type as the holes 90H. The plurality of regions 90A of the solid electrolyte layer 32 exposed through the plurality of holes 90H are regions in which solid electrolyte is to be chemically reduced. After the mask M1 is formed, the resultant product in which the mask M1 is formed is heat treated for a given hour under a hydrogen atmosphere. The hydrogen atmosphere may include hydrogen $H_2$ or argon Ar. At this point, a ratio of hydrogen:argon is approximately 1:19. Also, the heat treatment may be performed at a temperature in a range from about 500° C. to about 600° C. for about in a range from about 6 hours to about 12 hours.

As a result of the heat treatment, as depicted in FIGS. 23A and 23B, reduction layers 94 are formed in the exposed regions 90A of the solid electrolyte layer 32. The reduction layers 94 expand into an inner side from a surface of the solid electrolyte layer 32. Accordingly, the reduction layers 94 may have a shape surrounded by the solid electrolyte layer 32 except upper surfaces of the reduction layers 94. A thickness of the reduction layers 94 may be controlled according to the heat treatment conditions. FIG. 23A is a cross-sectional view taken in a direction of 23a-23a' of FIG. 23B.

After the heat treatment is completed, the mask M1 is removed, and then, as depicted in FIGS. 24A and 24B, a plurality of the reduction layers 94 separated from each other are formed in the solid electrolyte layer 32. The reduction layers 94 form a lattice type arrangement. The reduction layers 94 may be used as cathode layers.

FIGS. 25 through 30 are cross-sectional views of a method of manufacturing (hereinafter, a fourth manufacturing method) a metal-air battery according to an embodiment.

Figure 25:
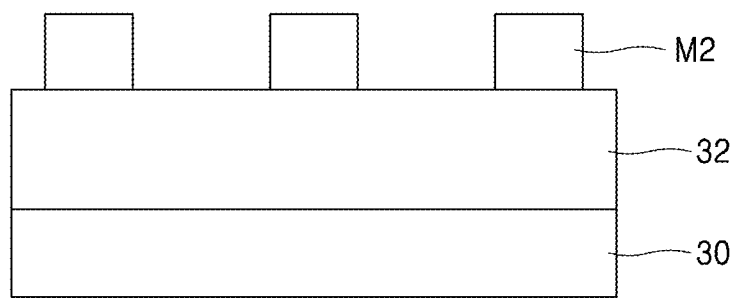
FIGS. 25 through 30 are cross-sectional views of an embodiment of a method of manufacturing a metal-air battery.
Figure 26:
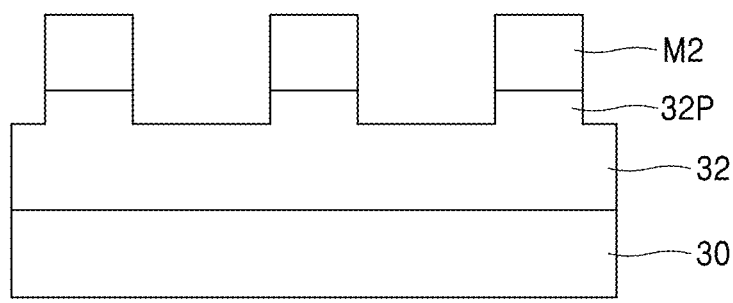
Figure 27:
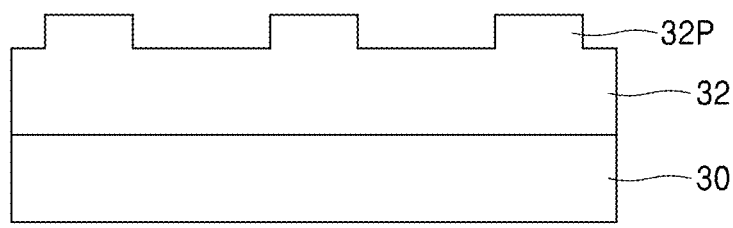

In the fourth manufacturing method, as depicted in FIG. 25, after forming the solid electrolyte layer 32 on the anode layer 30, a mask M2 is formed on the solid electrolyte layer 32. The mask M2 is formed to cover some regions of the solid electrolyte layer 32 and to expose a remaining region. As an example, in the solid electrolyte layer 32, the regions covered and the regions exposed by the mask M2 may be opposite to those by the mask M1 of FIGS. 22A and 22B. That is, in the mask M2, the regions covered by the mask M1 of FIGS. 22A and 22B may be exposed and the exposed regions by the mask M1 of FIGS. 22A and 22B may be covered. Accordingly, the regions covered by the mask M2 in the solid electrolyte layer 32 may form a lattice type. After the mask M2 is formed, the exposed region of the solid electrolyte layer 32 is etched. The etching may be performed for a given time. Through the etching, as depicted in FIG. 26, the solid electrolyte layer 32 is removed by a given thickness around the mask M2. FIG. 27 shows a resultant product after removing the mask M2.

Figure 28:
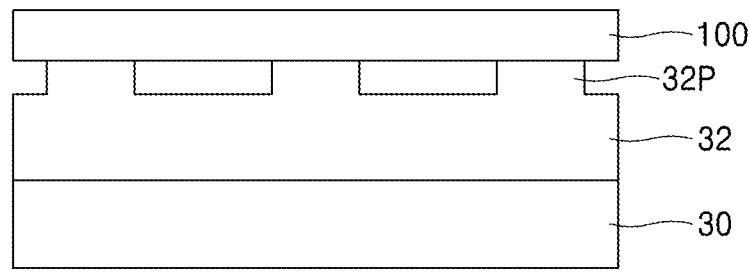
Figure 29:
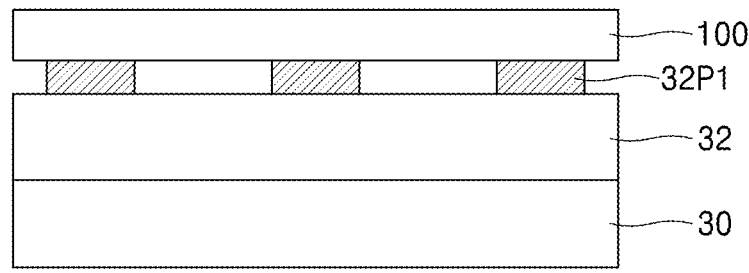

Referring to FIG. 27, as a result of the etching, a plurality of upward protrusions 32P are formed on the solid electrolyte layer 32. Next, as depicted in FIG. 28, a plate 100 is placed on the solid electrolyte layer 32 and the plurality of protrusion 32P to directly contact with the plurality of protrusions 32P. The plate 100 contacts only the plurality of protrusions 32P. The plate 100 directly contacts the entire upper surfaces of the plurality of protrusions 32P. The solid electrolyte layer 32 between the protrusions 32P does not contact the plate 100. The plate 100 is a reducing material layer, and is to chemically reduce the plurality of protrusions 32P. The plate 100 may be, for example, a lithium plate. The contact between the plate 100 and the plurality of protrusions 32P may be maintained for a given time or a set time, for example, as depicted in FIG. 29, until the whole, e.g., entireties of the, protrusions 32P are changed to chemically reduced protrusions 32P1. After the whole, e.g., entireties of the, protrusions 32P are changed to the chemically reduced protrusions 32P1, the plate 100 is separated.

Figure 30:
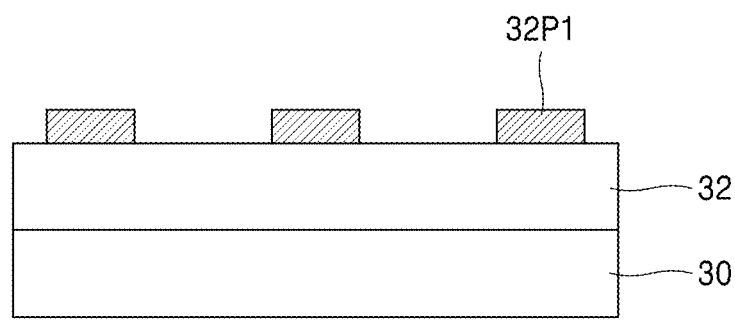

FIG. 30 shows a resultant product after the plate 100 is removed. Referring to FIG. 30, the plurality of chemically reduced protrusions 32P1 separated from each other are on the solid electrolyte layer 32. Since the chemically reduced protrusions 32P1 are formed by chemically reducing solid electrolyte in some parts of the solid electrolyte layer 32, the chemically reduced protrusions 32P1 have a greater electron and ion conductivity than the solid electrolyte layer 32. Also, an interfacial resistance between the chemically reduced protrusions 32P1 and the solid electrolyte layer 32 is less than an interfacial resistance between two material layers having a physical layer interface. The chemically reduced protrusions 32P1 may be used as cathode layers. The metal-air battery depicted in FIG. 2 may be formed through processes described with reference to FIGS. 25 to 30. After the plate 100 is removed, the GDL 36 (refer to FIG. 2) may further be formed.

Meanwhile, in an embodiment, the contact between the plate 100 and the plurality of protrusions 32P may further be maintained for a given time after solid electrolyte in the plurality of protrusions 32P is completely chemically reduced. Accordingly, after the entirety of the solid electrolyte in the plurality of protrusions 32P is chemically reduced, solid electrolyte in some parts of the solid electrolyte layer 32 below the plurality of protrusions 32P may be chemically reduced. As a result, the metal-air battery depicted in FIG. 3 may be formed.

Next, a method of manufacturing (hereinafter, a fifth manufacturing method) a metal-air battery according to an embodiment will be described with reference to FIGS. 31 through 35.

Figure 31:
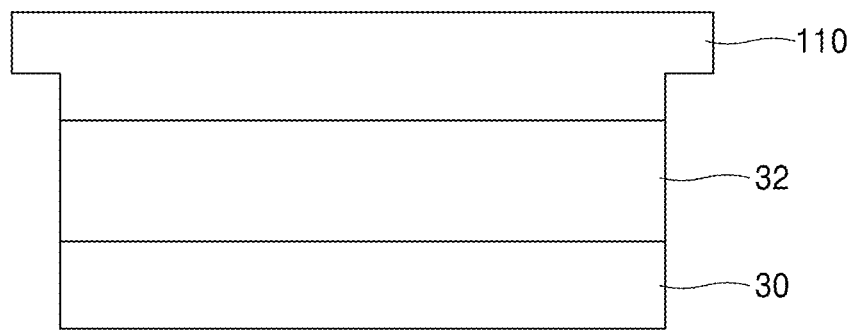
FIGS. 31 through 35 are cross-sectional views of an embodiment of a method of manufacturing a metal-air battery.
Figure 32:
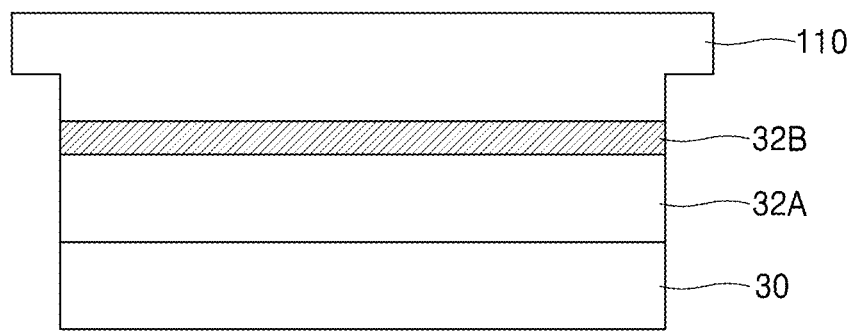

In the fifth manufacturing method, as depicted in FIG. 31, the solid electrolyte layer 32 is formed on the anode layer 30. Next, a reducing material layer 110 may be formed on the solid electrolyte layer 32. The reducing material layer 110 may include a material for chemically reducing solid electrolyte in an upper layer, e.g., part, of the solid electrolyte layer 32. The reducing material layer 110 may include a material that may combine oxygen in the solid electrolyte layer 32. The reducing material layer 110 may be a material layer including, for example, lithium, or a whole, e.g., an entirety, of the reducing material layer 110 may be a lithium layer. The reducing material layer 110 may be formed to directly contact an entire upper surface of the solid electrolyte layer 32. A contact state between the reducing material layer 110 and the solid electrolyte layer 32 may be maintained for a given time or a set time. Due to the direct contact between the reducing material layer 110 and the solid electrolyte layer 32, a reducing reaction occurs on an upper part of the solid electrolyte layer 32. Accordingly, solid electrolyte in the entire upper surface of the solid electrolyte layer 32 is chemically reduced. That is, a given thickness of the solid electrolyte layer 32 at the upper surface of the solid electrolyte layer 32 is chemically reduced. As a result, as depicted in FIG. 32, the solid electrolyte layer 32 is divided into an unreduced part 32A and a chemically reduced part 32B. The thickness of the chemically reduced part 32B may vary according to the contact time between the reducing material layer 110 and the solid electrolyte layer 32.

After solid electrolyte in a portion of the solid electrolyte layer 32 is chemically reduced, the reducing material layer 110 is separated from the solid electrolyte layer 32.

Figure 33:
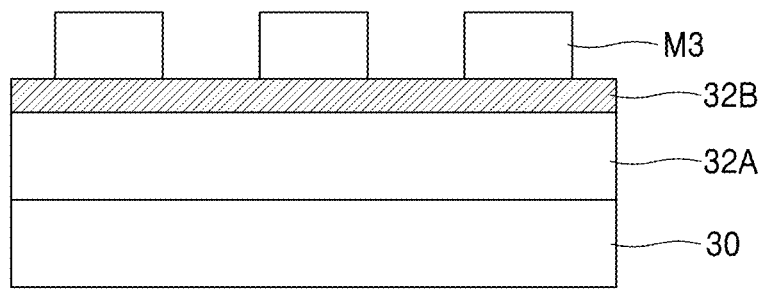
Figure 34:
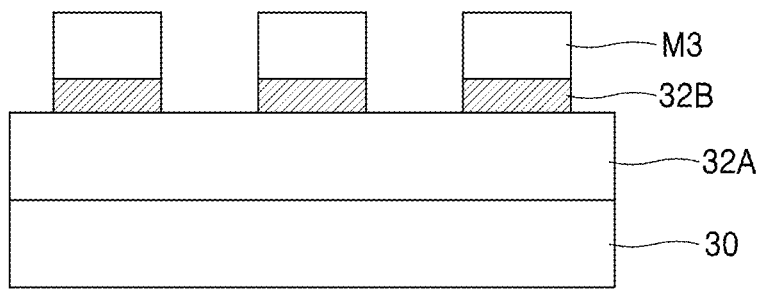
Figure 35:
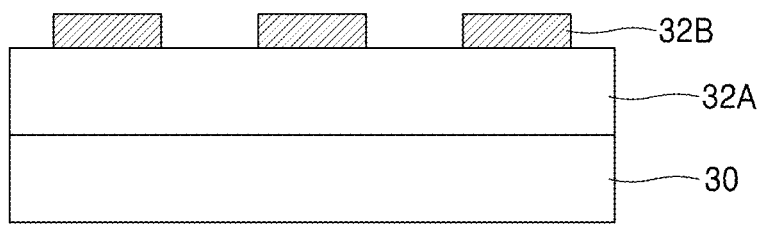

Next, as depicted in FIG. 33, a mask M3 that covers some regions of the chemically reduced part 32B and exposes a remaining part is formed on the chemically reduced part 32B. After the mask M3 is formed, an exposed region of the chemically reduced part 32B around the mask M3 is completely removed. A process of completely removing the exposed region may include a process of etching the exposed region of the chemically reduced part 32B after forming the mask M3. The process of etching the exposed region may be performed until the unreduced part 32A is exposed. Accordingly, as depicted in FIG. 34, upper surfaces of the unreduced part 32A around the mask M3 are exposed. Afterwards, when the mask M3 is removed, as depicted in FIG. 35, a plurality of chemically reduced parts 32B that are separated from each other are formed on the unreduced part 32A. The plurality of chemically reduced parts 32B may be cathode layers and may correspond to the cathode layers 34 of the metal-air battery depicted in FIG. 2.

Meanwhile, the fifth manufacturing method may be completed by removing the reducing material layer 110 from the resultant product of FIG. 32. That is, after chemically reducing solid electrolyte in a selected portion of an upper surface of the solid electrolyte layer 32, the solid electrolyte in the selected portion of the upper surface of the solid electrolyte layer 32 that is chemically reduced may be used as a cathode layer.

Next, a method of manufacturing (hereinafter, a sixth manufacturing method) a metal-air battery according to an embodiment will be described with reference to FIGS. 36 through 40.

Figure 36:
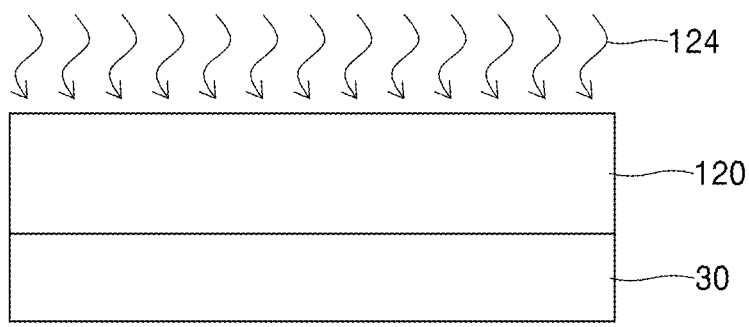
FIGS. 36 through 40 are cross-sectional views of an embodiment of a method of manufacturing a metal-air battery.

In the fifth manufacturing method, as depicted in FIG. 36, a solid electrolyte layer 120 is formed on the anode layer 30. Afterwards, the solid electrolyte layer 120 is heat treated 124 under a hydrogen atmosphere. The hydrogen atmosphere may include a hydrogen gas and an argon gas. At this point, a ratio of hydrogen:argon may be approximately 1:19. The heat treatment 124 under a hydrogen atmosphere may be performed for a given time, and a selected portion of solid electrolyte in a portion of the solid electrolyte layer 120 to be chemically reduced may vary according to time for performing the heat treatment 124. As an example, the heat treatment 124 under a hydrogen atmosphere may be performed for about 6 hours to about 12 hours at a temperature in a range from about 500° C. to about 600° C.

Figure 37:
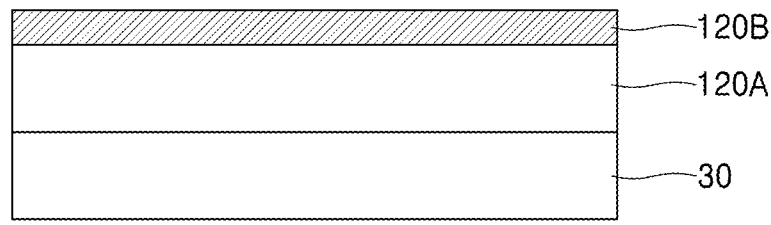
Figure 38:
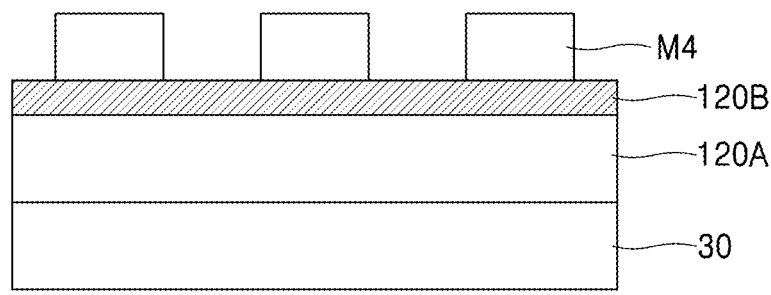
Figure 39:
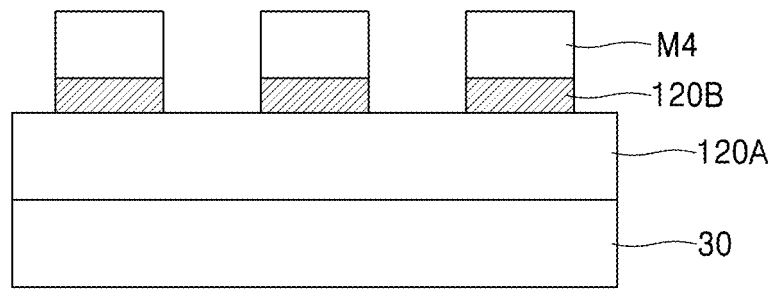
Figure 40:
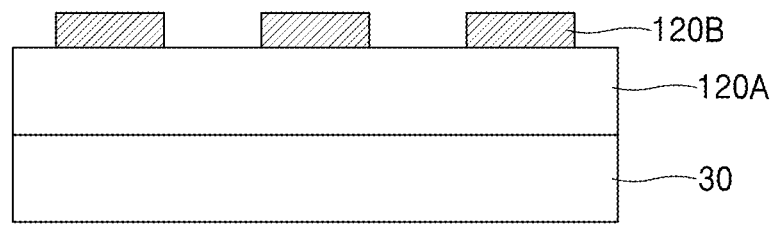

As a result of the heat treatment 124 under a hydrogen atmosphere, solid electrolyte in an upper part of the solid electrolyte layer 120 is chemically reduced. That is, solid electrolyte in a selected portion of the solid electrolyte layer 120 at the upper surface of the solid electrolyte layer 120 is chemically reduced. Accordingly, as depicted in FIG. 37, the solid electrolyte layer 120 is divided into an unreduced part 120A as a lower part of the solid electrolyte layer 120 and a chemically reduced part 120B as an upper part of the solid electrolyte layer 120. After the heat treatment 124 under a hydrogen atmosphere is completed, as depicted in FIGS. 38 through 40, a mask M4 is formed on the educed part 120B and then the chemically reduced part 120B is divided into a plurality of patterns using the mask M4. This process may be performed the same way as the process described with reference to FIGS. 33 through 35.

The sixth manufacturing method may be completed as a result of FIG. 37. That is, solid electrolyte in a selected portion of an upper part including the upper surface of the solid electrolyte layer 120 may be chemically reduced, and an entirety of the chemically reduced part 120B may be used as a cathode layer.

Figure 41:
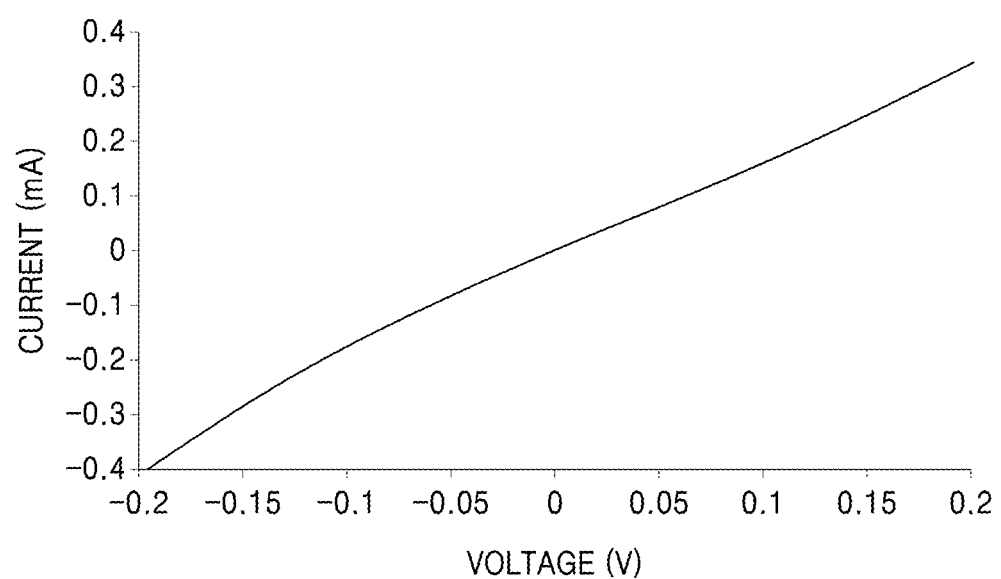
FIG. 41 is a graph of current (milliamperes (mA)) versus voltage (volts (V)) showing a test result of characteristics of a metal-air battery according to an embodiment.

FIG. 41 is a graph showing a voltage-current characteristics of a cathode layer, which is a part of a solid electrolyte layer of a metal-air battery in which solid electrolyte has been chemically reduced according to an embodiment. A result of FIG. 41 was obtained by using an LLTO layer as a solid electrolyte layer and a lithium layer as a reducing material layer or a reducing material layer stamp for chemically reducing solid electrolyte in a portion of the LLTO layer.

Referring to FIG. 41, a voltage-current of a cathode layer of a metal-air battery according to an embodiment exhibits a linear relation and an electron conductivity of the cathode layer is greater than $10^{-4}$ siemens per meter (S/m). When the solid electrolyte layer is an LLTO layer, the electron conductivity of the solid electrolyte layer is less than $10^{-7}$ S/m, the electron conductivity of the cathode layer that exhibits the voltage-current characteristics of FIG. 41 is greater than the electron conductivity of the solid electrolyte layer.

In the case of a metal-air battery, for example, a lithium-air battery, an adhesive layer may be disposed between an MIEC cathode and a solid electrolyte. That is, an adhesive layer may be present between the MIEC cathode and the solid electrolyte. Accordingly, interfacial resistance may be generated between the MIEC cathode and the adhesive layer and between the adhesive layer and the solid electrolyte, and accordingly, an undesired overvoltage may be generated.

In the case of the metal-air battery according to an embodiment, a chemically reduced part of a solid electrolyte is used as an MIEC cathode. Therefore, an intervening material layer, for example, an adhesive layer, may not be present between the MIEC cathode and the solid electrolyte. In other words, in the metal-air battery according to an embodiment, the MIEC cathode and the solid electrolyte are a continuous single body, e.g., a single unitary and indivisible body. In the metal-air battery according to an embodiment, a layer boundary interface, for example, a physical interface that may be present when material layers different from each other are stacked, is not present between the MIEC cathode and the solid electrolyte. Accordingly, a resistance between the MIEC cathode and the solid electrolyte of a metal-air battery according to an embodiment is decreased. Therefore, when a metal-air battery according to an embodiment is used, an overvoltage that may occur during use of a metal-air battery may be prevented, and thus, stability and reliability of a metal-air battery may be increased and the lifetime of the metal-air battery may be increased.

While one or more embodiments have been described with reference to the figures, it will be understood by those of ordinary skill in the art that various changes in form and details may be made therein without departing from the spirit and scope as defined by the following claims.

What is claimed is:

1. A metal-air battery comprising:
an anode layer;
a solid electrolyte layer; and
a cathode layer directly contacting the solid electrolyte layer,
wherein the solid electrolyte layer and the cathode layer are a single unitary and indivisible body with no physical interlayer boundary between the solid electrolyte layer and the cathode layer, and
wherein the cathode layer comprises chemically reduced material of the solid electrolyte layer.

2. The metal-air battery of claim 1, wherein a portion of the cathode layer is within the solid electrolyte layer.

3. The metal-air battery of claim 1, wherein the cathode layer has a shape protruding from the solid electrolyte layer.

4. The metal-air battery of claim 3, wherein a portion of the cathode layer is within the solid electrolyte layer.

5. The metal-air battery of claim 1, wherein the cathode layer comprises a plurality of separated patterns.

6. The metal-air battery of claim 5, wherein the plurality of separated patterns have a periodic arrangement.

7. The metal-air battery of claim 5, wherein each of the plurality of separated patterns has a column shape or a cylindrical shape.

8. The metal-air battery of claim 7, wherein the cylindrical shape comprises a single cylindrical shape or a double cylindrical shape.

9. The metal-air battery of claim 7, wherein the cylindrical shape comprises a circular cylindrical shape or a non-circular cylindrical shape.

10. The metal-air battery of claim 1, wherein the cathode layer is a single layer covering an entire upper surface of the solid electrolyte layer.

11. The metal-air battery of claim 1, wherein the cathode layer has a zigzag shape on the solid electrolyte layer.

12. The metal-air battery of claim 1, wherein the cathode layer comprises:
a first cathode layer; and
a second layer that is on and surrounds the first cathode layer.

13. The metal-air battery of claim 1, wherein the cathode layer has a spiral plane shape.

14. The metal-air battery of claim 1, wherein an electron conductivity of the cathode layer is greater than $10^{-4}$ siemens per meter.

15. A method of manufacturing a metal-air battery, the method comprising:
disposing a solid electrolyte layer on an anode layer; and
changing a portion of the solid electrolyte layer into a cathode layer to manufacture the metal-air battery of claim 1.

16. The method of claim 15, wherein the changing of the portion of the solid electrolyte layer into the cathode layer comprises:
defining a region of the solid electrolyte layer; and
chemically reducing solid electrolyte in the defined region to change the portion of the solid electrolyte layer into the cathode layer.

17. The method of claim 16, wherein the chemically reducing the solid electrolyte in the defined region comprises contacting the defined region with a reducing material layer that chemically reduces solid electrolyte in the solid electrolyte layer.

18. The method of claim 16, wherein the chemically reducing the solid electrolyte in the defined region comprises heat treating the defined region under a hydrogen atmosphere.

19. The method of claim 15, wherein the changing of the portion of the solid electrolyte layer into the cathode layer comprises:
disposing a protrusion in a region of the solid electrolyte layer; and
chemically reducing solid electrolyte in the protrusion.

20. The method of claim 19, wherein the chemically reducing the solid electrolyte in the protrusion comprises contacting the protrusion with a reducing material layer that chemically reduces solid electrolyte in the solid electrolyte layer.

21. The method of claim 15, wherein the changing of the portion of the solid electrolyte layer into the cathode layer comprises chemically reducing the solid electrolyte in a selected portion of an entire upper portion of the solid electrolyte layer, the entire upper portion comprising an upper surface of the solid electrolyte layer.

22. The method of claim 21, further comprising dividing chemically reduced solid electrolyte in the upper portion into a plurality of patterns separated from each other.

23. The method of claim 21, wherein the chemically reducing the solid electrolyte in the selected portion of the entire upper portion, comprising the upper surface, of the solid electrolyte layer comprises contacting the entire upper surface of the solid electrolyte layer with a reducing material layer.

24. The method of claim 21, wherein the chemically reducing the solid electrolyte in the selected portion of the upper part, comprising the upper surface, of the solid electrolyte layer comprises heat treating the solid electrolyte layer under a hydrogen atmosphere.

25. The method of claim 22, wherein the dividing comprises:
- forming a mask on the chemically reduced upper portion of the solid electrolyte, the mask covering regions of the chemically reduced solid electrolyte corresponding to a plurality of patterns separated from each other;
- exposing a remaining region of the chemically reduced solid electrolyte; and
- etching the exposed part of the chemically reduced solid electrolyte.

* * * * *